United States Patent Office 2,787,459
Patented Apr. 2, 1957

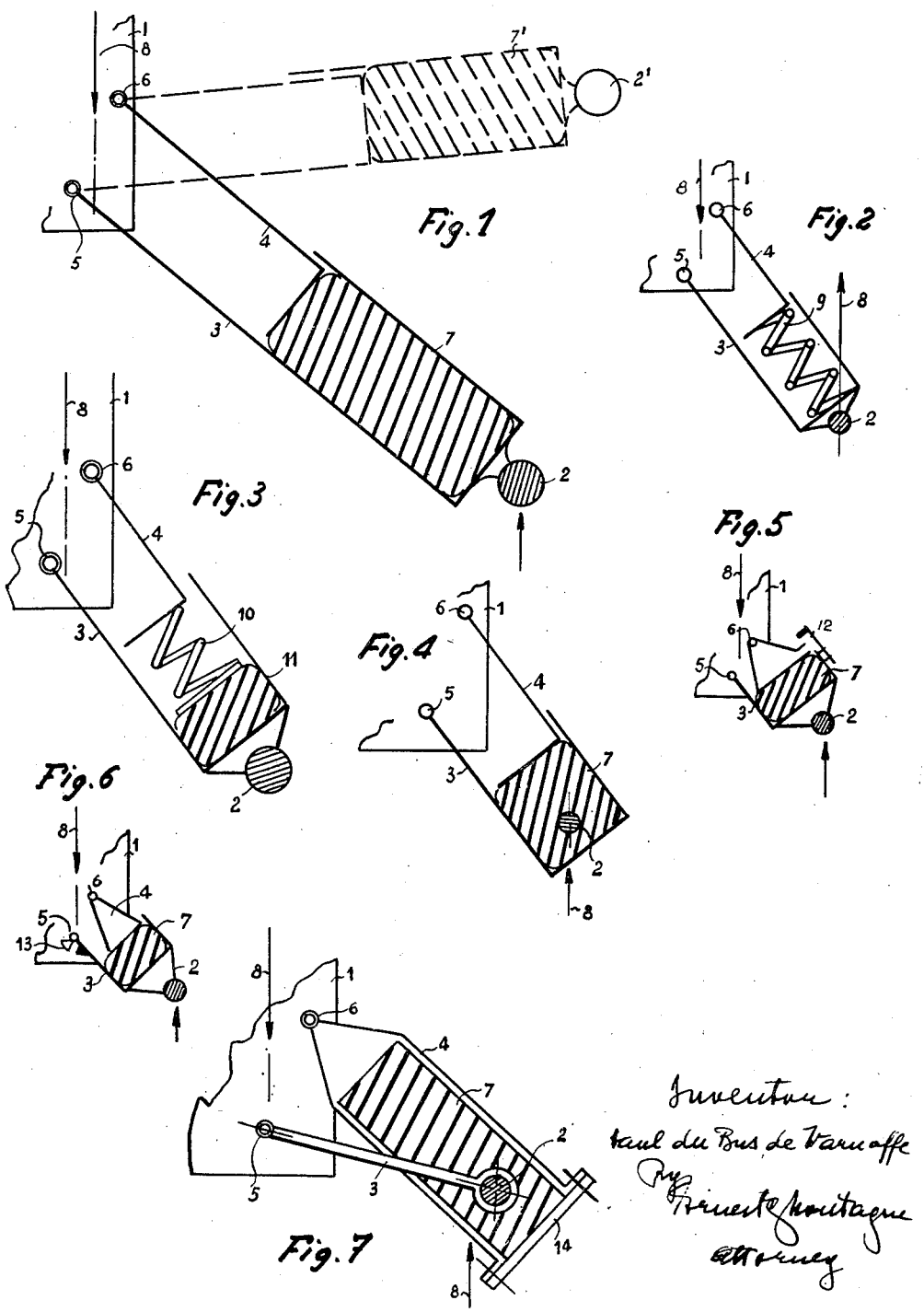

2,787,459

ELASTIC SUSPENSION

Paul du Bus de Warnaffe, Boitsfort, Belgium

Application November 2, 1954, Serial No. 466,373

Claims priority, application Belgium November 17, 1953

7 Claims. (Cl. 267—15)

The present invention relates to a combination for elastic suspension for a member which is vertically movable with reference to another member and more particularly to the suspension of a vehicle chassis with reference to the wheeled structure carrying it such as a wheel, an axle or a member moving vertically in unison therewith.

It is the main object of the present invention to provide an elastic suspension in which each wheel of a vehicle is pivotally connected with the chassis and vertical movements of each wheel are subject to a damping action by resilient means disposed between the wheels and said said chassis.

It is another object of the present invention to provide an elastic suspension which comprises a first member which is vertically movable with reference to a second member and elastic means are disposed between a guide arm and suspension crank, both pivotally secured, respectively, along parallel horizontal axes to the first member, the two parallel axes being positioned in such manner that in one extreme position the elastic means are relaxed while in the other extreme position the elastic means are stressed to a maximum.

In a preferred embodiment of the present invention, the first member forms part of the chassis of a vehicle while the second member is constituted by the axle or by a part moving vertically together with a wheel.

With these and other objects in view which will become apparent in the following detailed description, the present invention will be clearly understood in connection with the accompanying drawings, in which:

Figure 1 is an elevational view of a first embodiment of the present invention as applied to the suspension of a vehicle chassis; and Figs. 2 to 7 illustrate each a modification to said embodiment.

Referring now to the drawings and in particular to Fig. 1, the suspension connects the chassis 1 of the vehicle with an element 2 of the wheel support. An angle shaped lever 3 and a second lever 4 are pivotally secured, respectively, to horizontal pivots 5 and 6, which are parallel with each other and are mounted on the chassis 1. The lever 3 is rigidly secured to the element 2. Between the oppositely disposed faces of the levers 3 and 4 are elastic means 7 which are constituted in the case illustrated by a block of rubber or synthetic resin.

The pivot 5 is located underneath the pivot 6 and is positioned horizontally apart from the latter in a direction opposite to that facing the element 2 of the wheel support. If the oppositely disposed faces of the levers 3 and 4 are in engagement with the respective end faces of the block 7, as illustrated in solid lines in Fig. 1 and if the members 1 and 2 rock relative to each other anticlockwise, as seen in Fig. 1, the levers 3 and 4 compress the block 7 proportionally to the magnitude of the torque 8, 8 which produces the relative rotation of the members 1 and 2. For a maximum compression, the block 7 assumes the shape shown at 7', the element 2 of the wheel support assuming then the position 2' (Fig. 1). When the torque effect decreases, the elastic block 7' expands and urges apart the oppositely disposed faces of the levers 3 and 4, so as to make the members 1 and 2 rock clockwise and to restore the original position of the members 1 and 2 relative to each other when the amount of the torque has returned to zero. Thus, the cooperation of all elements set forth above brings about a surprising stability to the chassis, since the shocks received by the wheels are subjected to a damping action due to the resilient means disposed between the two levers 3 and 4.

Referring now to the embodiments disclosed in Figs. 2 and 3, the elastic means are formed by a spring 9 (Fig. 2) or by a spring 10 associated with a block 11 of rubber or synthetic resin (Fig. 3); the advantage of the latter arrangement arises from the block 11 which damps the vibrations of the spring 10.

Referring now to the embodiment disclosed in Fig. 4, the element 2 of the wheel suport is elastically connected with the lever 3 as provided through the actual elasticity of the block 7 in which the element 2 of the wheel support is embedded; to this end, the element 2 extends through the elastic block 7 in close proximity with the end face of the lever 3 adapted to compress the elastic block 7.

In the embodiment disclosed in Fig. 5, the suspension element 3 carries a stop 12 illustrated as a removable insert for cooperation with a complementary projection in the other suspension element 4 so as to limit the expanding movement of the block 7.

A modification of the last mentioned embodiment is disclosed in Fig. 6 and shows an abutment 13 rigid with the chassis 1 and limiting in a similar manner, the relative turning movement of the elements 3 and 4.

Referring now to the embodiment disclosed in Fig. 7, interengagement between the elastic block 7 and the suspension element 3 is provided directly through the actual element 2 extending through the block 7. As clearly shown, the outer end of the suspension element 4 is open and is closed by a removable plate 14 which provides means for readily inspecting, cleaning, mounting, dismantling and replacing the different parts. Obviously the removable plate used for the same purposes may be incorporated in the same manner into the other embodiments disclosed above. The spacing of the pivots 5 and 6 may be adjusted so as to increase and possibly decrease their eccentricity whereby the travel of the wheel relative to the chassis under the action of a predetermined shock may be defined in accordance with the state of the road travelled over and/or the load of the vehicle.

While I have disclosed several embodiments of the present invention, it is to be understood that these embodiments are given by example only and not in a limiting sense, the scope of the present invention being determined by the objects and the claims.

I claim:

1. An elastic suspension for vehicles comprising a chassis, a wheel support, two horizontally disposed pivot means spaced apart from each other and secured to said chassis, a first member and a second member, both members forming oppositely disposed faces spaced apart from each other, resilient means disposed between said oppositely disposed faces and adapted to be compressed between said first member and said second member during turning of said members, upon said respective pivot means, each of said members being pivotally secured to said chassis by means of said respective pivot means and turnable independently from each other at least for a limited distance, and one of said members being fixedly secured to said wheel support, whereby said members are caused to swing relative to said chassis during relative vertical displacements of the chassis and the wheel support and said resilient means opposing said relative vertical displacements.

2. The elastic suspension for vehicles, as set forth in claim 1, in which said first member includes a first lever pivotally connected to one of said pivot means, and said second member includes a second lever pivotally connected to the other of said pivot means, and said levers being arranged in a longitudinally disposed vertical plane of said chassis, and both said levers having at their ends remote from said pivot means crosswise disposed portions forming said faces, and said resilient mean being secured between said crosswise disposed portions of said respective first and second members.

3. The elastic suspension for wheels, as set forth in claim 1, in which said first and second members have a flange formation at the end remote from the said corresponding pivot means, and the said resilient means are disposed between said respective flange formations.

4. The elastic suspension for vehicles, as set forth in claim 1, in which said resilient means comprises a resilient block.

5. The elastic suspension for vehicles, as set forth in claim 1, in which said resilient means comprises a helical spring.

6. The elastic suspension for vehicles, as set forth in claim 1, in which said resilient means comprises a resilient block and a helical spring, said block and said spring being disposed in superimposed position between said first and second members.

7. The elastic suspension for vehicles, as set forth in claim 1, in which a portion of said wheel support is embedded in said resilient means.

References Cited in the file of this patent

UNITED STATES PATENTS

| | | |
|---|---|---|
| 1,875,314 | Armstrong | Aug. 30, 1932 |
| 2,104,499 | Svoboda et al. | Jan. 4, 1938 |
| 2,166,880 | Schuh et al. | July 18, 1939 |
| 2,616,686 | Gregoire | Nov. 4, 1952 |